US008237795B2

(12) United States Patent
Mizusawa et al.

(10) Patent No.: US 8,237,795 B2
(45) Date of Patent: Aug. 7, 2012

(54) DRIVING ASSISTANCE DEVICE

(75) Inventors: Kazufumi Mizusawa, Kanagawa (JP); Tatsuto Ryuugou, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1444 days.

(21) Appl. No.: 11/721,934

(22) PCT Filed: Dec. 22, 2005

(86) PCT No.: PCT/JP2005/023594
§ 371 (c)(1),
(2), (4) Date: Jun. 15, 2007

(87) PCT Pub. No.: WO2006/068222
PCT Pub. Date: Jun. 29, 2006

(65) Prior Publication Data
US 2008/0100472 A1 May 1, 2008

(30) Foreign Application Priority Data

Dec. 24, 2004 (JP) ................................ 2004-372767

(51) Int. Cl.
*H04N 7/18* (2006.01)
(52) U.S. Cl. ...................................................... 348/148
(58) Field of Classification Search .................. 348/148
See application file for complete search history.

(56) References Cited

U.S. PATENT DOCUMENTS

| 7,295,227 | B1 * | 11/2007 | Asahi et al. | 348/118 |
|---|---|---|---|---|
| 2002/0128750 | A1 * | 9/2002 | Kakinami et al. | 701/1 |
| 2004/0153243 | A1 * | 8/2004 | Shimazaki et al. | 701/300 |
| 2004/0201670 | A1 * | 10/2004 | Mizusawa et al. | 348/136 |

FOREIGN PATENT DOCUMENTS

| EP | 1123844 A1 | 8/2001 |
|---|---|---|
| JP | 03-107088 A | 5/1991 |
| JP | 10244891 A | 9/1998 |
| JP | 200110431 A | 1/2001 |
| JP | 200171842 A | 3/2001 |
| JP | 2001180405 | 7/2001 |
| JP | 2003291759 A | 10/2003 |
| JP | 2004284370 A | 10/2004 |
| JP | 2004345528 A | 12/2004 |

OTHER PUBLICATIONS

International Search Report, dated Mar. 27, 2006.
European Search Report.

* cited by examiner

*Primary Examiner* — Mehrdad Dastouri
*Assistant Examiner* — Jeremaiah Hallenbeck-Huber
(74) *Attorney, Agent, or Firm* — Panasonic Patent Center; Dhiren Odedra; Kerry Culpepper

(57) ABSTRACT

The driving assistance device is adapted to have the first guide marker occupy a first position to ensure that the roadside occupies the first position in superimposed relationship with the first guide marker, at the time of making a judgment that an angle of the vehicle to the roadside is equal to a predetermined value, after the vehicle is moved toward the space in reverse gear with one maximum steering angle, and to have the second guide marker occupy a second position to ensure that the roadside occupies the second position in superimposed relationship with the second guide marker, at the time of making a judgment that the second guide marker is superimposed on the roadside, after the automotive vehicle is moved toward the space straight in reverse gear and the vehicle is parked, after the vehicle is moved toward the space in reverse gear with the other maximum steering angle.

12 Claims, 15 Drawing Sheets

Real Space　　　　　　　　　　Screen (a)　　　　　　　　　　(b)

DRIVING ASSISTANCE DEVICE

TECHNICAL FIELD OF THE INVENTION

This invention relates to a driving assistance device for allowing an in-vehicle camera pointed at an object behind an automotive vehicle to take an image indicative of the object, and assisting a driver in parking the automotive vehicle in a parallel parking manner by displaying the image on a screen visible from a driver's seat in the automotive vehicle, and more particularly to a driving assistance device for superimposing two or more guide markers on an image to be displayed on a screen, and assisting a driver in parking the automotive vehicle in a parallel parking manner.

DESCRIPTION OF THE RELATED ART

In recent years, there have been put in practical use, and becoming increasingly popular a wide variety of driving assistance devices of this type, one example of which is adapted to allow an in-vehicle camera pointed at an object behind an automotive vehicle to take an image indicative of the object, and to display the image on a screen visible from a driver's seat in the automotive vehicle, and another example of which is adapted to assist a driver in parking the automotive vehicle in a parallel parking manner by displaying the image on a screen visible from a driver's seat in the automotive vehicle, and superimposing, on the image, two or more guide markers defined as a clue for parking the automotive vehicle in the parallel parking manner.

When the automotive vehicle is moved in reverse gear, and parked in a parallel parking space, the conventional driving assistance device disclosed in, for example, a patent document 1 is adapted to superimpose a guide marker on an image of an object behind the automotive vehicle, to display the image with the guide marker on the screen, and to inform the driver about a steering angle and an appropriate position at which the driver turns the steering wheel.

When the driver is about to park an automotive vehicle in a parallel parking manner by driving the automotive vehicle in reverse gear, the conventional driving assistance device disclosed in the patent document 1 is adapted to superimpose, on an image to be displayed on a screen, a steering angle guide marker defined as a predictive parking space. When, for example, the driver turns the steering wheel, the conventional driving assistance device is adapted to change the on-screen position of the steering angle guide marker in response to the changing steering angle. When the driver drives the automotive vehicle in reverse gear without failing to superimpose the steering angle guide marker on a parallel parking space, and, the automotive vehicle is parked in the parallel parking space.

The conventional driving assistance device disclosed in the patent document 1, however, is not simple in construction by reason that the conventional driving assistance device disclosed in the patent document 1 comprises a sensor for sensing the steering angle of the steering wheel, means for changing the on-screen position of the steering angle guide marker, and the like. Furthermore, it is hard for the driver to keep the steering wheel at an appropriate angle so as to allow the steering angle guide marker to be superimposed on the parallel parking space when the automotive vehicle is moved in reverse gear.

On the other hand, the conventional driving assistance device disclosed in a patent document 2 is adapted to display guide markers useful in assisting a driver in parking the automotive vehicle in the parallel parking manner through steps of turning a steering wheel, driving the automotive vehicle in reverse gear at a maximum steering angle, turning back the steering wheel, and driving straight in reverse gear.

As shown in FIG. 13(a), the conventional driving assistance device disclosed in the patent document 2 is adapted to define an imaginary line segment 55 on a road, to have the line segment 55 fixed with respect to an automotive vehicle 50 to be moved in reverse gear, and parked in a parallel parking manner (by having the line segment 55 move imaginarily on the basis of the movement of the automotive vehicle 50), and to superimpose, on the image to be displayed on a screen, a guide marker corresponding to the line segment 55.

As shown in FIG. 15, a vehicular swept path 40 of an outermost portion of the automotive vehicle 50 to be turned to the right in reverse gear at the maximum steering angle, for example, a tangent 41 is defined as the line segment 55 at an intersection point of the vehicular swept path 40 and a center axis 46 of the automotive vehicle 50, or a line segment 42 distant from the tangent 41 by a distance "d" in an outward direction, and parallel to the tangent 41. Here, the distance "d" between the automotive vehicle 50 and the roadside 57 is considered if necessary. The tangent 41 and the line segment 42 is inclined at an angle "α" with respect to the center line 46 (or, the leftward lateral line parallel to the center line 46) of the automotive vehicle 50. The tangent 41 or the line segment 42 defined as the line segment 55 is fixed in place on the screen without being fixed with respect to the automotive vehicle 50.

The driver turns the steering wheel all the way to the right at a position shown in FIG. 13(a). The automotive vehicle 50 is then moved in reverse gear at the maximum steering angle until the line segment 55 is parallel to the roadside 57 (see FIG. 13(b)). Then, the driver turns back the steering wheel at the time of making a judgment that the line segment 55 is parallel to the roadside 57. The automotive vehicle 50 is then moved straight in reverse gear until the line segment 55 is superimposed on the roadside 57 (see FIG. 13(c)). Then, the driver turns the steering wheel all the way to the left. The automotive vehicle 50 is then moved in reverse gear at the maximum steering angle until the automotive vehicle 50 is parallel to the roadside 57. The automotive vehicle 50 is stopped at the time of making a judgment that the automotive vehicle 50 is parallel to the roadside 57 (see FIG. 13(d)).

Further, a guide marker disclosed in the patent document 2 is useful for allowing the automotive vehicle 50 shown in FIG. 13(a) to move without bumping against other automotive vehicle parked in the vicinity of the automotive vehicle 50. As shown in FIG. 15, a line segment 43 distant from by a distant "t" in a forward direction, and parallel to a line segment 45 inversely inclined at an angle "α" with respect to the leftward lateral line 44 of the automotive vehicle 50 is superimposed on an image, and displayed as the guide marker.

Here, the distance "t" is determined on the basis of a boundary line of an area in which the automotive vehicle 50 shown in FIG. 13(a) can move without bumping against other automotive vehicle parked in the vicinity of the automotive vehicle 50 when the driver turns the wheel all the way to the left, drives the automotive vehicle 50 in reverse gear at the leftward maximum steering angle, turns the steering wheel all the way to the right under the condition that a line segment 55 is parallel to the roadside 57. Therefore, the automotive vehicle 50 shown in FIG. 13(a) is moved straight in reverse gear to a point at which the guide marker is not in superimposed relationship with said other automotive vehicle, and then moved from that point to a parallel parking space.

patent document 1: Jpn. unexamined patent publication No. 2001-180405 patent document 2: Jpn. unexamined patent publication No. 2003-291759

DISCLOSURE OF THE INVENTION

Problems to be Solved by the Invention

The conventional driving assistance device disclosed in the patent document 2, however, encounters such a problem that, when the automotive vehicle is moved in reverse gear, the driver must confirm whether or not the line segment 55 is parallel to the roadside 57 as shown in FIG. 13(b). When, for example, two parallel lines defined on a road are parallel to each other, those lines are parallel to each other on an image shown in FIG. 14(a) as a view from the above.

On the other hand, those lines are not parallel to each other, and intersects at one point on an image shown in FIG. 14(b) as a view from an in-vehicle camera. As a result, it is difficult for the driver to judge, on the basis of the lines on the image, whether or not those lines are parallel to each other in real space. This leads to the fact that the driver tends to fail to park the automotive vehicle in a designated space even if the driver operates the automotive vehicle by using the video taken by the in-vehicle camera.

It is, therefore, an object of the present invention to provide a driving assistance device that can assist a driver in parking the automotive vehicle in a parallel parking manner with accuracy.

Means for Solving the Problems

The driving assistance device, comprising: imaging means for taking an image of an object behind an automotive vehicle; and displaying means for displaying, on a screen, the image with support information useful in assisting a driver in parking the automotive vehicle in a parallel parking space, characterized in that the driving assistance device further comprises: roadside detecting means for detecting a roadside from the image taken by the imaging means in the vicinity of the parallel parking space; and guide marker producing and superimposing means for producing, at least, first and second guide markers as the support information, and superimposing the first and second guide markers on the image to be displayed by the displaying means, wherein the guide marker producing and superimposing means is adapted to estimate an on-screen position of the first guide marker to the automotive vehicle, the automotive vehicle being moved toward the parallel parking space in reverse gear at one of maximum steering angles opposite to each other until an angle of the automotive vehicle to the roadside is equal to a predetermined value, the first guide marker being in superimposed relationship with the roadside detected by the roadside detecting means at the time of allowing the angle of the automotive vehicle to the roadside to be equal to the predetermined value, to estimate an on-screen position of the second guide marker to the automotive vehicle, the automotive vehicle being moved toward the parallel parking space in reverse gear at the other of the maximum steering angles until the second guide marker is superimposed on the roadside detected by the roadside detecting means, and to ensure that the automotive vehicle is parked in the parallel parking space at the time of allowing the second guide marker to be superimposed to the roadside detected by the roadside detecting means.

The driving assistance device thus constructed as previously mentioned according to the present invention can allow the driver to confirm with accuracy whether or not the angle of the automotive vehicle to the roadside is equal to a predetermined value, and assist the driver in parking the automotive vehicle in a parallel parking space.

In the driving assistance device according to the present invention, the guide marker producing and superimposing means may be adapted to define, as the first guide marker, a first straight line inclined at a predetermined angle with respect to the automotive vehicle, and to define, as the second guide marker, a second straight line parallel to the first straight line, and tangent to an estimated vehicular swept path of the automotive vehicle to be moved in reverse gear at one of the maximum steering angles.

The driving assistance device thus constructed as previously mentioned according to the present invention can assist the driver in parking the automotive vehicle in a parallel parking space with accuracy through steps of allowing the driver to drive the automotive vehicle in reverse gear in a straight line after driving the automotive vehicle in reverse gear at one of the maximum steering angles, and allowing the driver to drive the automotive vehicle in reverse gear at the other of the maximum steering angles after allowing the driver to confirm that the second guide marker is superimposed on the roadside on a screen.

In the driving assistance device according to the present invention, the guide marker producing and superimposing means may be adapted to produce a third guide marker for indicating a position of the roadside detected by the roadside detecting means, and to superimpose, on the image to be displayed by the displaying means, the third guide marker with the first and second guide markers.

The driving assistance device thus constructed as previously mentioned according to the present invention can allow the driver to confirm whether or not the roadside is misidentified by the roadside detecting means, before parking the automotive vehicle in a parallel parking space.

In the driving assistance device according to the present invention, the roadside detecting means is adapted to detect two or more candidate roadsides from the image taken by the imaging means in the vicinity of the parallel parking space. The guide marker producing and superimposing means may be adapted to have two or more third guide markers indicate respective on-screen positions of the candidate roadsides, to produce, as the first guide marker, two or more first guide markers corresponding to the respective candidate roadsides, and to superimpose, on the image to be displayed by the displaying means, the first to third guide markers, the automotive vehicle being moved toward the parallel parking space in reverse gear at one of the maximum steering angles until the angle of the automotive vehicle to the roadside is equal to the predetermined value, the first guide marker corresponding to the candidate roadside selected as the roadside being superimposed on the selected candidate roadside when the angle of the automotive vehicle to the roadside is equal to the predetermined value.

The driving assistance device thus constructed as previously mentioned according to the present invention can assist the driver in parking the automotive vehicle in a parallel parking space with accuracy by allowing the driver to confirm with accuracy whether or not the angle of the automotive vehicle to the roadside is equal to a predetermined value even if the roadside detecting means detects two or more candidate roadsides without identifying one roadside.

The driving assistance device according to the present invention comprises: imaging means for taking an image of an object behind an automotive vehicle; and displaying means for displaying, on a screen, the image with support information useful in assisting a driver in parking the automotive vehicle in a parallel parking space, characterized in that the driving assistance device further comprises guide marker producing and superimposing means for producing first to third guide markers as the support information, and superimposing the first to third guide markers on the image to be displayed by the displaying means, wherein the guide marker producing and superimposing means is adapted to have the third guide markers indicate respective on-screen positions of the candidate roadsides, to estimate on-screen positions of the first guide markers to the automotive vehicle, the automotive vehicle being moved toward the parallel parking space in reverse gear at one of the maximum steering angles until an angle of the automotive vehicle to the roadside is equal to a predetermined value, the first guide marker corresponding to the candidate roadside selected as a roadside being superimposed on the selected candidate roadside when the angle of the automotive vehicle to the roadside is equal to the predetermined value, and to estimate on-screen positions of the second guide markers of the automotive vehicle, the automotive vehicle being moved toward the parallel parking space in reverse gear at the other of the maximum steering angles until the second guide marker corresponding to the candidate roadside selected as the roadside is superimposed on the selected candidate roadside, the automotive vehicle being parked in the parallel parking space when the second guide marker corresponding to the candidate roadside selected as the roadside is superimposed on the selected candidate roadside.

The driving assistance device thus constructed as previously mentioned according to the present invention can assist the driver in parking the automotive vehicle in a parallel parking space with accuracy by allowing the driver to select an optimum guide marker from among the first guide markers on the basis of the on-screen position of the roadside to each of the third guide markers.

In the driving assistance device according to the present invention, the guide marker producing and superimposing means may be adapted to have the first guide markers belong to respective groups, to have the third guide markers belong to the respective groups, and to characterize the first and third guide markers of each group by color or by shape.

The driving assistance device thus constructed as previously mentioned according to the present invention can allow the driver to confirm an optimum combination of the guide markers with ease.

In the driving assistance device according to the present invention, at least one of the first and second guide markers may be represented by not only a straight line but also a point.

The driving assistance device thus constructed as previously mentioned according to the present invention can allow the driver to confirm the guide markers with ease.

In the driving assistance device according to the present invention, the guide marker producing and superimposing means is adapted to define, as the second guide marker, an estimated vehicular swept path of the automotive vehicle to be moved in reverse gear at the other of the maximum steering angles.

The driving assistance device thus constructed as previously mentioned according to the present invention can allow the driver to confirm, with accuracy, whether or not the automotive vehicle reaches a switching point with accuracy even if the angle of the automotive vehicle to the roadside is not equal to the predetermined value.

Advantageous Effect of the Invention

It is an object to provide a driving assistance device having an advantageous effect of allowing the driver to make a judgment on whether or not the automotive vehicle is moved to a specific position, and inclined at a specific angle with respect to the roadside on the basis of the guide markers without fail. Therefore, the driving assistance device can allow the driver to park the automotive vehicle in a parallel parking space with accuracy by allowing the driver to drive the automotive vehicle on the basis of the guide markers. Even if the driver is a beginner, the driving assistance device can allow the driver to park the automotive vehicle in a parallel parking space without fail.

EXPLANATION OF THE REFERENCE NUMERALS

Figure 1:
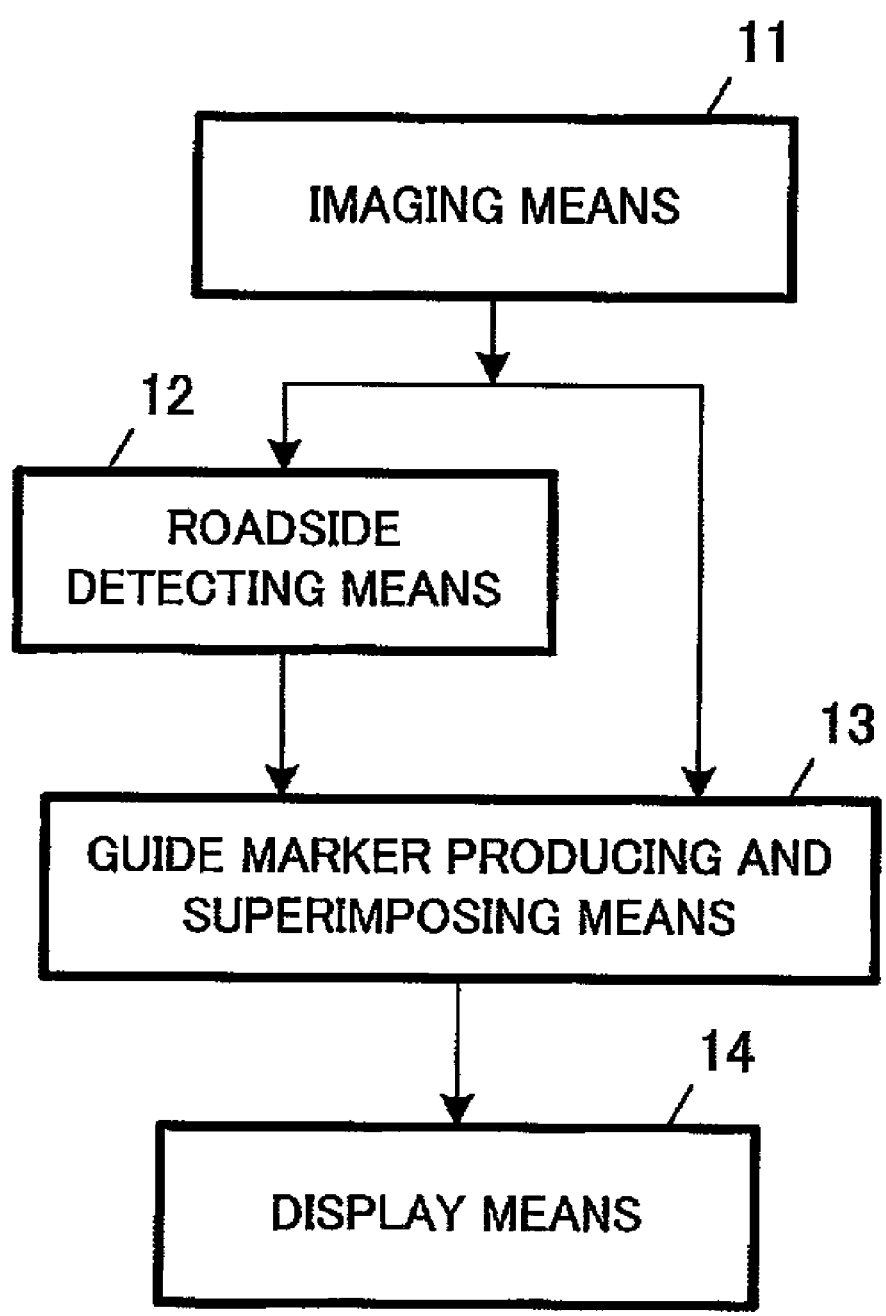
FIG. 1 is a block diagram showing the first embodiment of the driving assistance device according to the present invention.

11: imaging means
12: roadside detecting means
13: guide marker producing and superimposing means 14: displaying means
21: imaging means
23: guide marker producing and superimposing means
24: displaying means
50: automotive vehicle
51: other automotive vehicle
55: line segment tangent to a vehicular swept path of the automotive vehicle moved in reverse gear at a maximum steering angle
57: roadside
1011: roadside guide marker on the road
1012: entry angle guide marker on the road
1013: switchback position guide marker on the road
1014: roadside guide marker on the screen
1015: entry angle guide marker on the screen
1016: switchback position guide marker on the screen
1021: first roadside guide marker on the road
1022: second roadside guide marker on the road
1023: third roadside guide marker on the road
1024: first entry angle guide marker on the road
1025: second entry angle guide marker on the road
1026: third entry angle guide marker on the road
1031: first roadside guide marker on the screen
1032: second roadside guide marker on the screen
1033: third roadside guide marker on the screen
1034: first entry angle guide marker on the screen
1035: second entry angle guide marker on the screen
1036: third entry angle guide marker on the screen
1037: switchback position guide marker on the screen

DESCRIPTION OF THE PREFERRED EMBODIMENTS

First Embodiment

The driving assistance device according to the first embodiment of the present invention is adapted to assist a driver in parking an automotive vehicle in a parallel parking manner by superimposing three guide markers on an image to be displayed on a screen. All the driver has to do in the process of parking an automotive vehicle in a parallel parking manner is to just drive in reverse gear at a maximum steering angle, and drive straight in reverse gear on the basis of the three guide markers.

As shown in FIG. 1, the driving assistance device comprises imaging means 11 for taking an image of one or more objects behind the automotive vehicle, roadside detecting means 12 for detecting a roadside from the image taken by the imaging means 11, guide marker producing and superimposing means 13 for producing, on the basis of the roadside detected by the roadside detecting means 12, three guide markers useful in assisting the driver in parking the automotive vehicle in a parallel parking space, and superimposing the guide markers on the image to be displayed on the screen, and displaying means 14 for displaying the image with the guide markers.

Figure 2:
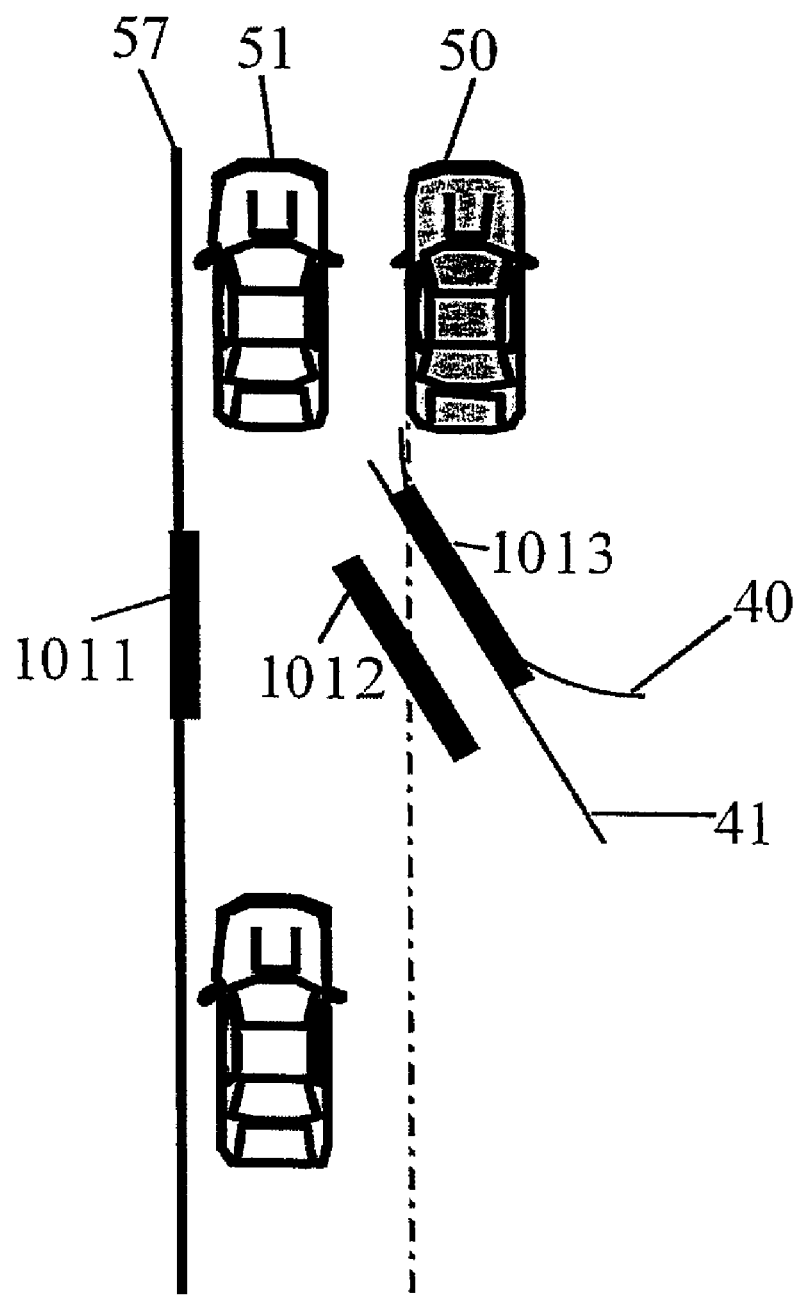
FIG. 2 is a view for explaining guide markers on a road in the first embodiment of the driving assistance device according to the present invention.
Figure 13:
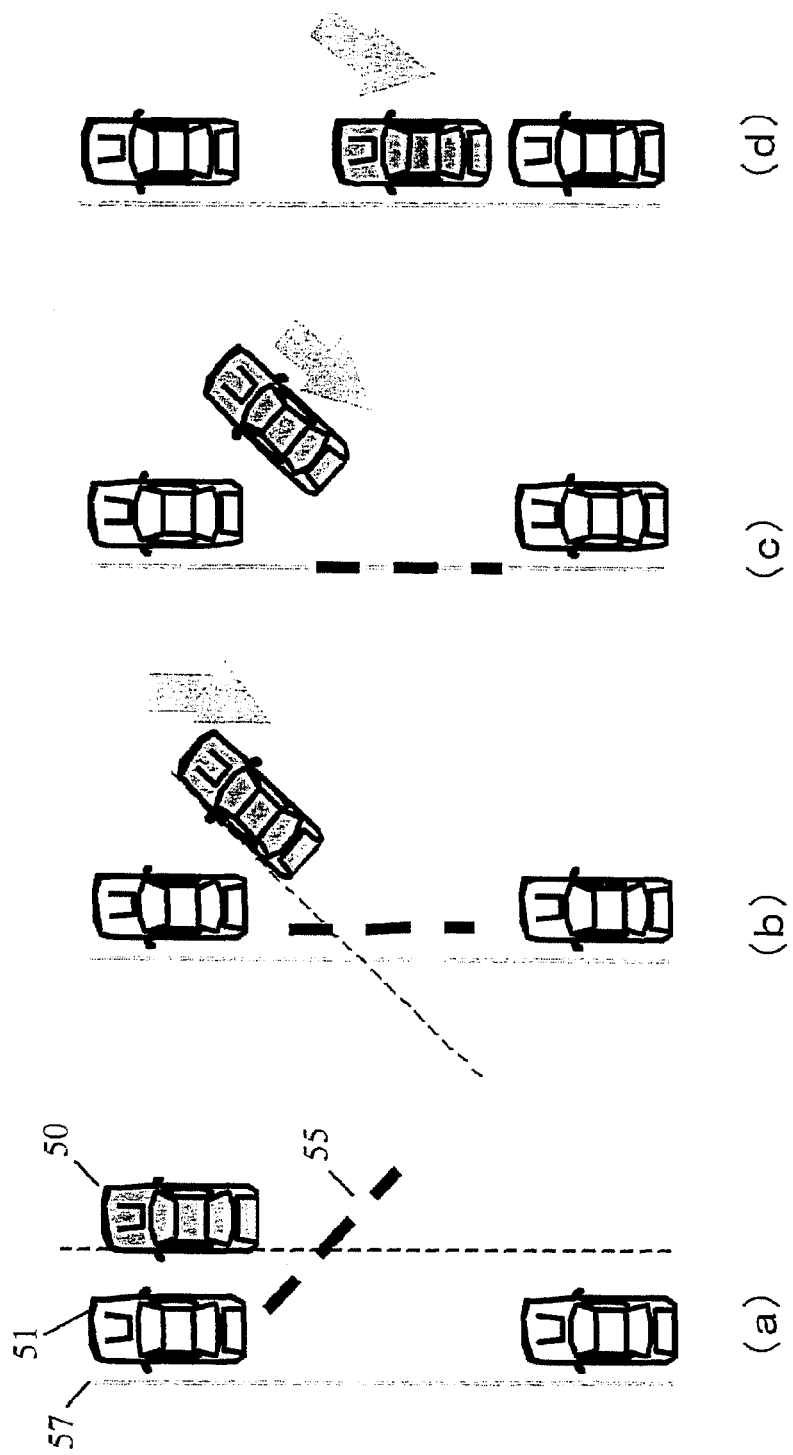
FIG. 13 is a view for explaining an operation of the conventional driving assistance device.
Figure 14:
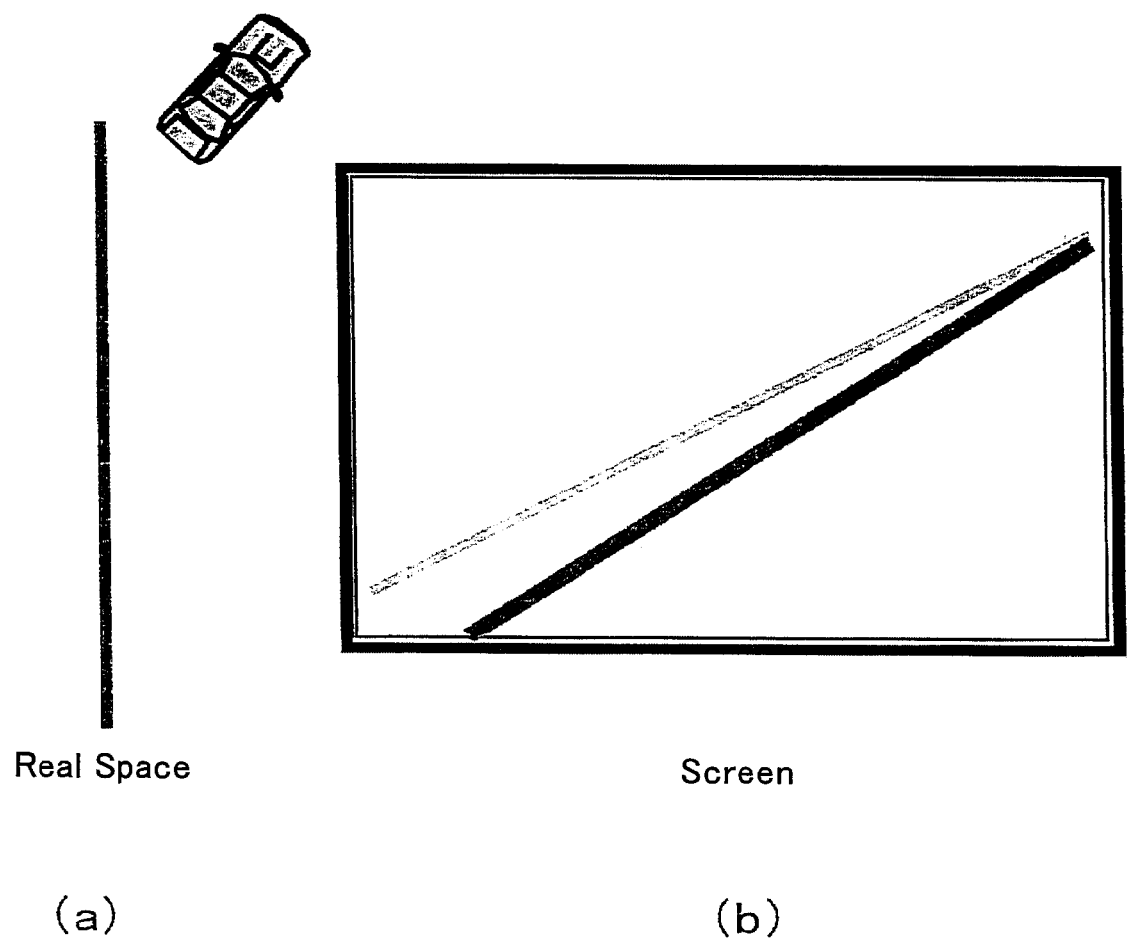
FIG. 14 is a view for explaining a problem with the conventional driving assistance device.

As shown in FIG. 2, the guide markers includes a guide marker 1011 for indicating the detected roadside 57, a guide marker 1013 equivalent to a line segment 55 shown in FIG. 13, and a guide marker 1012 parallel to the guide marker 1013.

The guide marker 1011 is disposed on the roadside 57 detected by the roadside detecting means 12, and intended to allow the driver to judge whether or not the roadside 57 is correctly detected by the roadside detecting means 12, and hereinafter referred to as "roadside guide marker".

When the automotive vehicle 50 is moved in reverse gear at the maximum steering angle, the guide marker 1012 is intended to allow the driver to judge whether or the automotive vehicle 50 is inclined at a specific angle with respect to the roadside 57, and hereinafter referred to as "entry angle guide marker". The driver turns back a steering wheel at the time of making a judgment that the automotive vehicle 50 is inclined at the specific angle with respect to the roadside 57. The automotive vehicle 50 is then moved straight in reverse gear.

When the automotive vehicle 50 is moved straight in reverse gear, the guide marker 1013 is intended to allow the driver to judge whether or not the automotive vehicle reaches a point where the driver turns the steering wheel, and hereinafter referred to as "switchback position guide marker".

The imaging means 11 mounted on the automotive vehicle 50, and pointed at one or more objects behind the automotive vehicle 50 is adapted to take an image indicative of the objects, and to output the image to the roadside detecting means 12 and the guide marker producing and superimposing means 13. The roadside detecting means 12 is adapted to detect a roadside from the image received from the imaging means 11, to output information about the detected roadside to the guide marker producing and superimposing means 13.

For example, the roadside detecting means 12 may be adapted to detect edges of a roadside from the image received from the imaging means 11, and to estimate, by using the Hough transformation, a straight line parallel to and spaced part from the automotive vehicle 50 on the basis of the distance from the automotive vehicle 50.

The guide marker producing and superimposing means 13 is adapted to produce a roadside guide marker 1101 to be superimposed on the roadside 57 detected by the roadside detecting means 12. When the automotive vehicle 50 is moved in reverse gear at the maximum steering angle, the guide marker producing and superimposing means 13 is adapted to estimate a position to be occupied by "entry angle guide marker". When the automotive vehicle 50 is inclined with respect to a roadside at, for example, an angle "α" shown in FIG. 15, "entry angle guide marker" is on the roadside. On the basis of the position to be occupied by "entry angle guide marker" to the automotive vehicle 50, the guide marker producing and superimposing means 13 is adapted to produce an entry angle guide marker 1012, and to estimate an on-screen position to be occupied by the entry angle guide marker 1012. Further, the guide marker producing and superimposing means 13 is adapted to calculate a straight line 41 tangent to an estimated vehicular swept path 40 of the automotive vehicle 50 to be moved in reverse gear at the maximum steering angle, and parallel to the entry angle guide marker, and to produce a switchback position guide marker 1013 on the basis of the current position of the automotive vehicle 50. The guide marker producing and superimposing means 13 is adapted to superimpose the produced guide markers on the image received from the imaging means 11, while the displaying means 14 is adapted to display, on the screen, the image with the guide markers.

Figure 3:
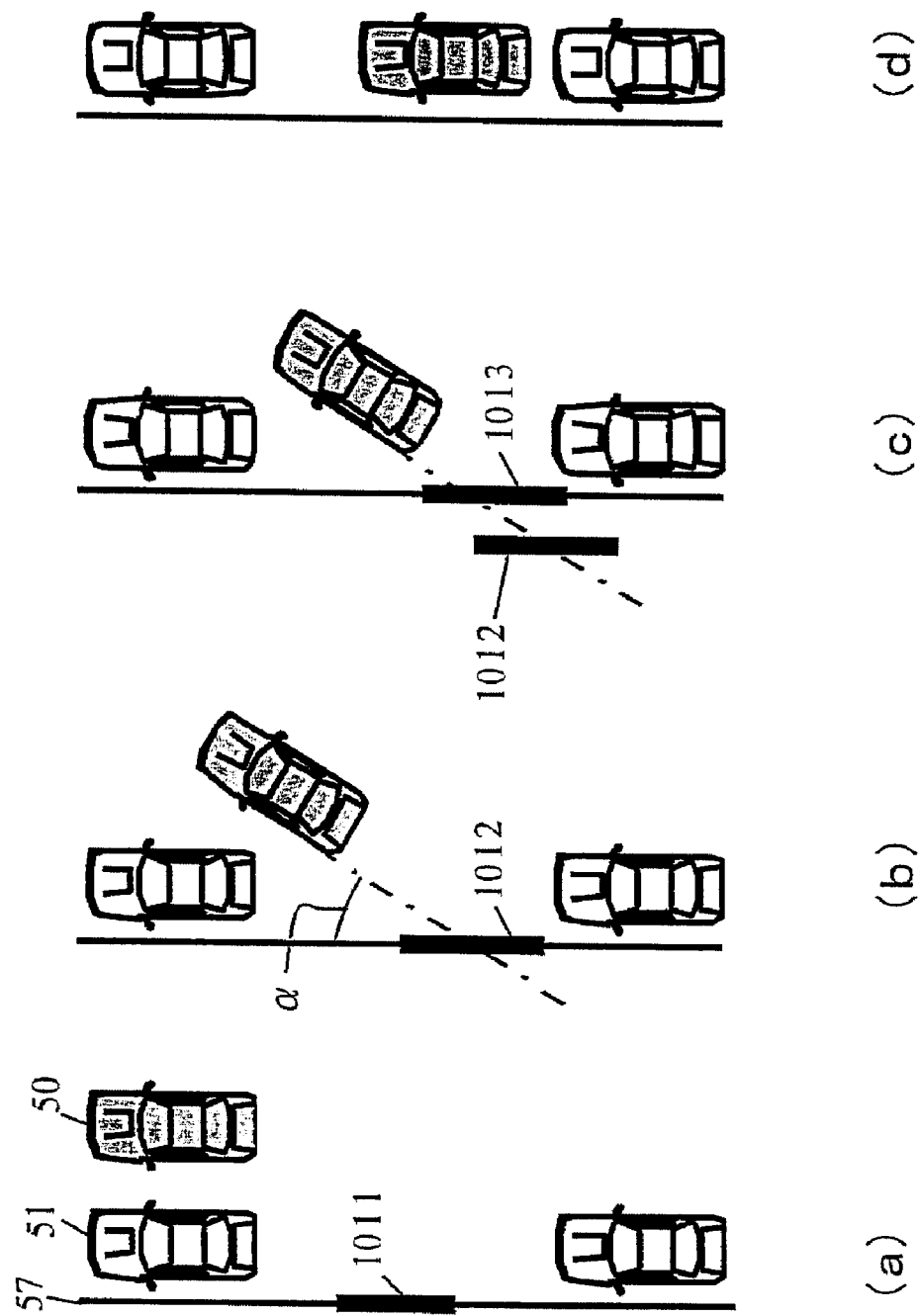
FIG. 3 is a view for explaining a method of parking an automotive vehicle in a parallel parking manner by using guide markers in the first embodiment of the driving assistance device according to the present invention.

FIG. 3 is a schematic view for explaining an operation procedure for parking the automotive vehicle in a parallel parking manner on the basis of the above-mentioned guide markers. As shown in FIG. 3, the guide markers are virtually disposed on a road. The following description will be directed to guide markers to be disposed on a screen, and to be related to the guide markers virtually disposed on the road.

Firstly, the driver stops the automotive vehicle 50 next to the automotive vehicle 51 parked in a parking space adjacent to an empty parking space (see FIG. 3(a)). At this point, the roadside detecting means 12 detects a roadside 57, and then outputs information about the detected roadside 57 to the guide marker producing and superimposing means 13. The guide marker producing and superimposing means 13 produces, on the basis of the detected roadside 57, a roadside guide marker 1011, an entry angle guide marker 1012, and a switchback position guide marker 1013, and superimposes the guide markers on the image taken by the imaging means 11. In this stage, the driver can confirm whether or not the roadside 57 is correctly detected by the roadside detecting means 12 on the basis of the image displayed with the guide markers.

Then, the driver turns the steering wheel all the way to the left, moved in reverse gear until the entry angle guide marker 1012 is superimposed on the roadside 57, or until the angle of the automotive vehicle 50 to the roadside 57 is equal to, for example, an angle "α" (see FIG. 3(a)).

The entry angle guide marker 1012 can be uniquely determined as a straight line inclined at an angle "α" with respect to the roadside 57 under the condition that the automotive vehicle 50 is in parallel relationship with respect to the roadside 57, the straight line being superimposed on the roadside 57 when the automotive vehicle 50 is moved in reverse gear at the maximum steering angle.

Figure 4:
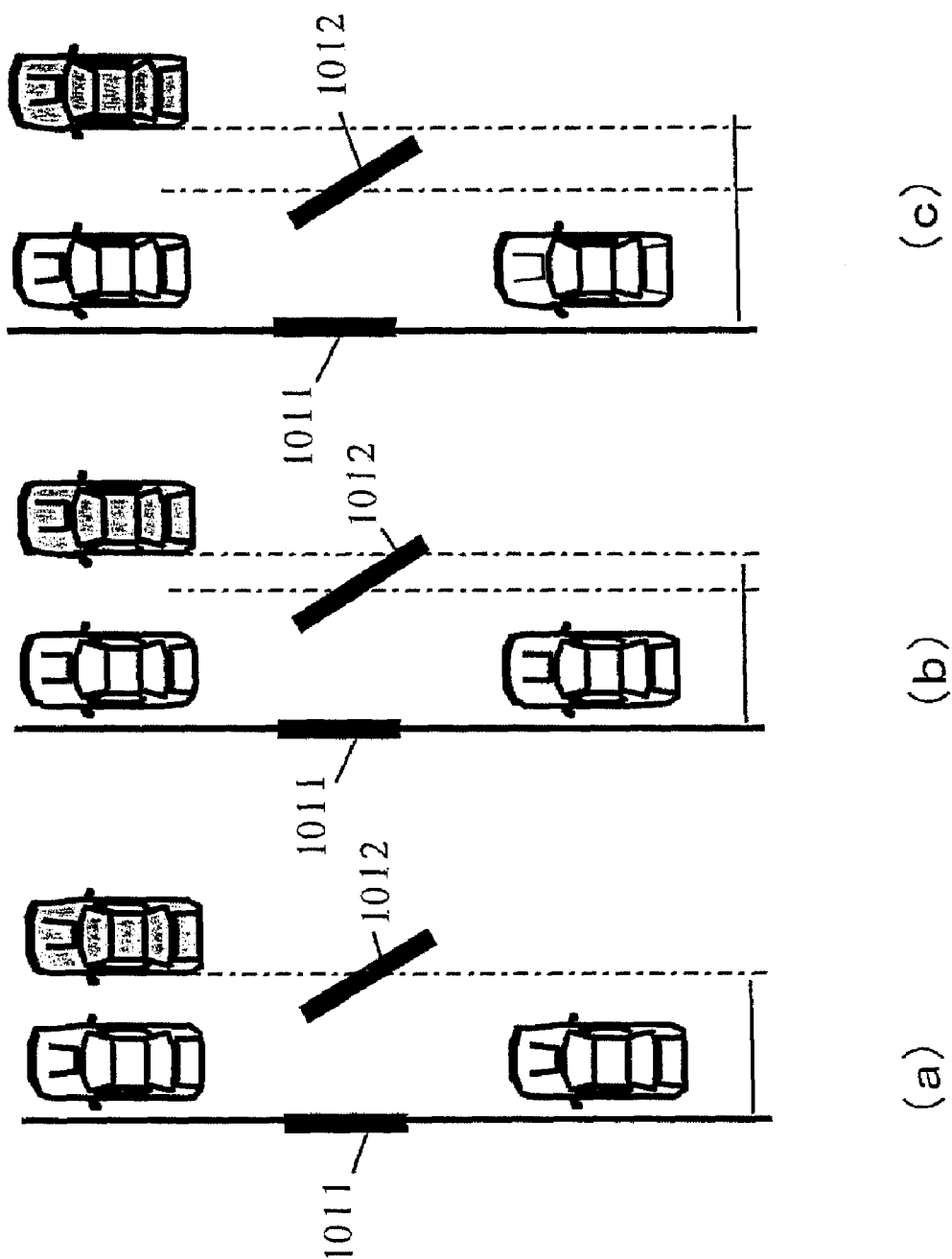
FIG. 4 is a view for explaining a relationship between a roadside guide marker and an entry angle guide marker in the first embodiment of the driving assistance device according to the present invention.

As shown in FIGS. 4(a), 4(b), and 4(c), under the condition that the automotive vehicle 50 is in parallel relationship with the roadside 57, the relative positions of the roadside guide marker 1011 and the entry angle guide marker 1012 to the automotive vehicle 50 are not dependent on the distance between the automotive vehicle 50 and the roadside 57. More specifically, the on-screen positions of the roadside guide marker 1011 and the entry angle guide marker 1012 are uniquely determined on the basis of the positions of the automotive vehicle 50 and the roadside 57.

Figure 5:
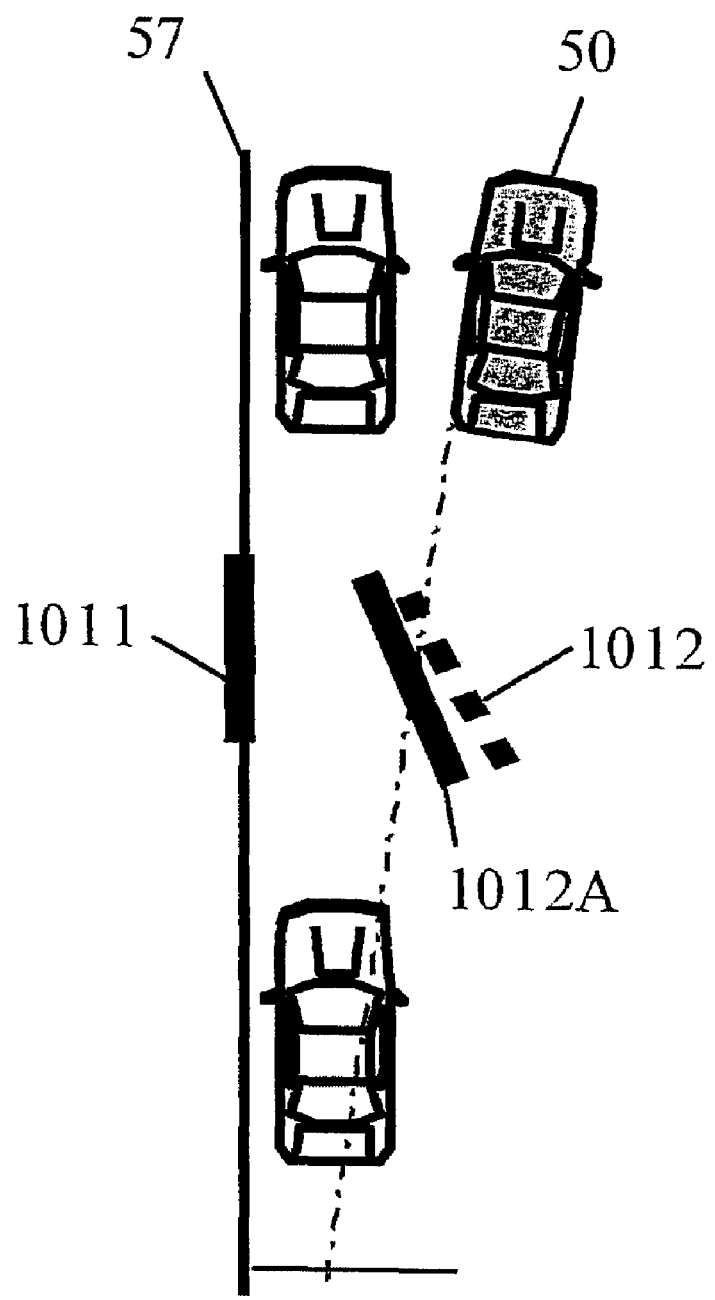
FIG. 5 is a view for explaining the position of the entry angle guide marker to the automotive vehicle in the first embodiment of the driving assistance device according to the present invention.

As shown in FIG. 5, even if the automotive vehicle 50 is not in parallel relationship with the roadside 57, the driving assistance device can calculate an angle of the automotive vehicle 50 to the roadside 57 by detecting the roadside 57. Accordingly, the driving assistance device can determine an entry angle guide marker 1012A which is displayed on the roadside 57 when the automotive vehicle 50 is stopped at the time of starting to assist a driver in parking the automotive vehicle 50 in a parallel parking space, then moved in reverse gear at the maximum steering angle until the angle of the automotive vehicle 50 to the roadside 57 is equal to the angle "α". In FIG. 5, the position of the marker 1012 is intended to indicate a position which is occupied by the entry angle guide marker 1012A when the automotive vehicle 50 is firstly stopped at an initial position in parallel relationship with the roadside 57.

When the entry angle guide marker 1012 is superimposed on the roadside 57 on the screen (see FIG. 3(b)), the driver turns back the steering wheel, and drives the automotive vehicle 50 in reverse gear until the switchback position guide marker 1013 is superimposed on the roadside 57 on the screen, i.e., until the tangent line of the estimated vehicular swept path of the automotive vehicle 50 to be moved in reverse gear at the maximum steering angle is superimposed on the roadside 57 on the screen (see FIG. 3(c)). The switchback position guide marker 1013 can be uniquely defined as a straight line parallel to the entry angle guide marker 1012 on the road, and tangent to the estimated vehicular swept path of the automotive vehicle to be moved in reverse gear at the maximum steering angle.

When the switchback position guide marker 1013 is superimposed on the roadside 57 on the screen, the driver steers to the right, and drives the automotive vehicle 50 in reverse gear at the maximum steering angle until stopping the automotive vehicle 50 in parallel relationship with the roadside 57.

Figure 6:
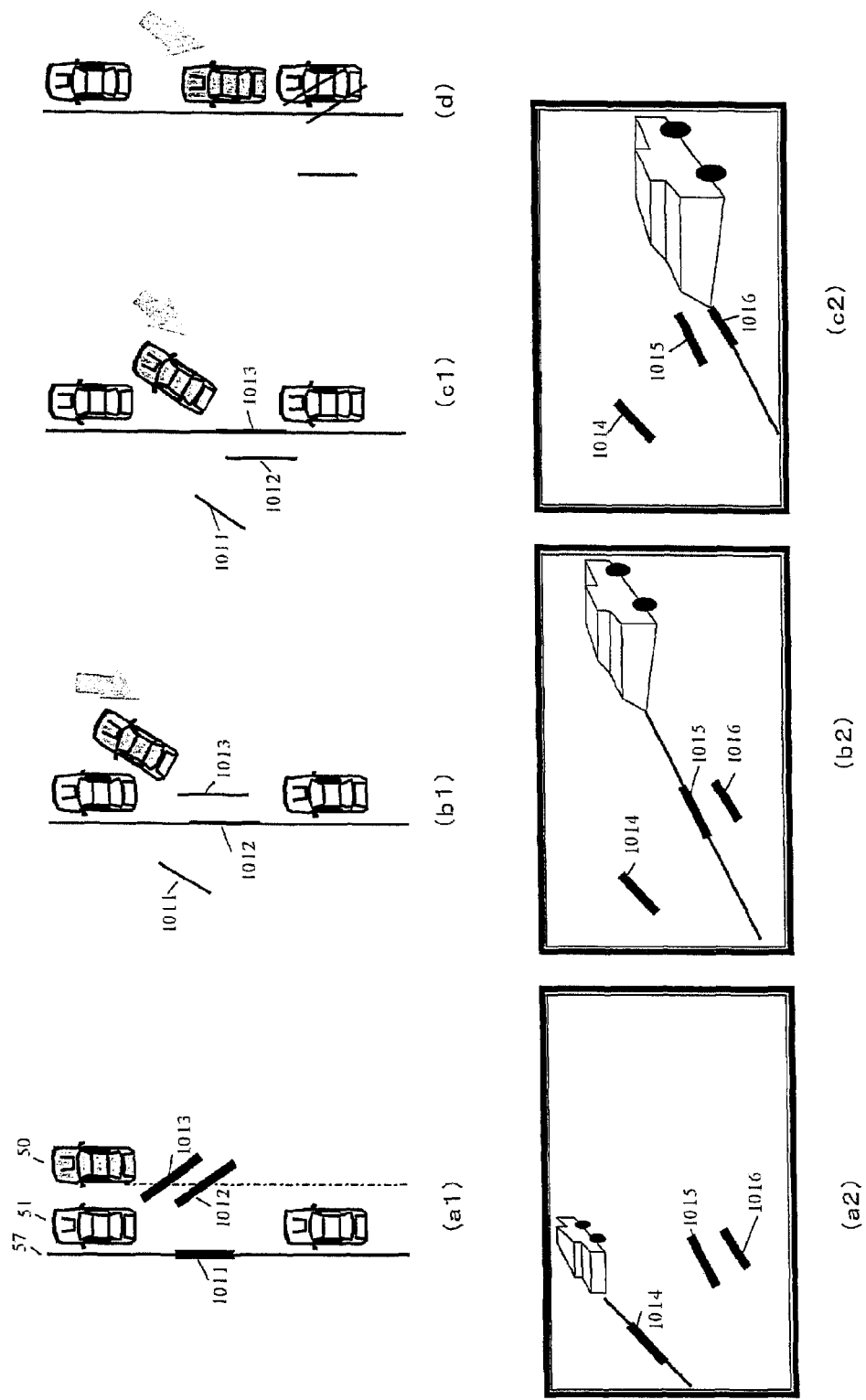
FIG. 6 is a view showing guide markers on the road and guide markers on the screen in the first embodiment of the driving assistance device according to the present invention.

The following description will be then directed to a procedure for assisting a driver in parking an automotive vehicle in a parallel parking manner on the basis of the guide markers superimposed on the image. FIGS. 6(a1), 6(b1), 6(c1) and 6(d) are views showing the automotive vehicle on the road, the roadside guide marker 1011, the entry angle guide marker 1012, and the switchback position guide marker 1013. FIGS. 6(a2), 6(b2), and 6(c2) are views corresponding to FIGS. 6(a1), 6(b1), and 6(c1), and showing images displayed with the roadside guide marker 1011, the entry angle guide marker 1012, and the switchback position guide marker 1013.

Firstly, the driver stops the automotive vehicle 50 next to the automotive vehicle 51 parked in a parking space adjacent to an empty parking space (see FIG. 6(a1)). At this point in time, the roadside guide marker 1014, the entry angle guide marker 1015, and the switchback position guide marker 1016 are superimposed on the image to be displayed on the screen (see FIG. 6(a2)). Then, the driver confirms whether or not the roadside guide marker 1014 is correctly disposed on the detected roadside. When the roadside is correctly detected on the image, it is apparent that the guide markers are correctly disposed on the image.

Then, the driver turns the steering wheel all the way to the left, and drives the automotive vehicle 50 in reverse gear until the entry angle guide marker 1015 is superimposed on the roadside on the screen (see FIG. 6(b2)). When the entry angle guide marker 1015 is superimposed on the roadside on the screen, the angle of the automotive vehicle 50 to the roadside is equal to a predetermined angle "α".

Then, the driver turns back the steering wheel, and drives the automotive vehicle 50 in reverse gear until the switchback position guide marker 1016 is superimposed on the roadside on the screen (see FIG. 6(c2)). When the switchback position guide marker 1016 is superimposed on the roadside on the screen, the driver turns the steering wheel all the way to the right, and drives the automotive vehicle 50 in reverse gear while confirming whether or not the automotive vehicle 50 is parallel to the roadside 57. At the time of making a judgment that the automotive vehicle 50 is parallel to the roadside 57, the automotive vehicle 50 is in the parallel parking space.

From the foregoing description, it will be understood that the driving assistance device according to the first embodiment can assist the driver in parking the automotive vehicle in the parallel parking manner with ease and accuracy by allowing the driver to confirm whether or not the each of the guide markers is superimposed on the roadside on the screen.

While there has been described in the foregoing description about the operation of the driving assistance device on the assumption that the roadside 57 is correctly detected by the roadside detecting means 12. However, it's not always possible to detect the roadside 57 without being affected by circumstances surrounding the automotive vehicle 50. Therefore, the roadside detecting means 12 may be adapted to determine, on the basis of luminance of each edge, candidate roadsides to be ranked in the top three. In this case, the guide marker producing and superimposing means 13 produces roadside guide markers useful for allowing a user to confirm whether or not the roadside is correctly detected, the candidate guide markers corresponding to the respective candidate roadsides, superimposes the roadside guide markers on the respective candidates roadsides of the image taken by the imaging means 11, further produces entry angle guide markers respectively corresponding to the candidate roadsides detected by the roadside detecting means 12, then superimposes the entry angle guide markers on the same image. When the roadside 57 is correctly detected by the roadside detecting means 12, and indicated by the roadside guide marker, the entry angle guide marker corresponding to the relevant roadside guide marker is useful for the driver. Therefore, the roadside guide markers may be different in, for example, color, line type or the like from one another, and may be respectively the same in color, line type or the like as the entry angle guide markers for the purpose of allowing the driver to confirm with his/her eyes groups of the roadside guide markers and the entry angle guide markers, and to distinguish, with ease, the entry angle guide marker corresponding to the roadside guide marker from the remaining entry angle guide markers.

The driving assistance device can allow the driver to park the automotive vehicle in a parallel parking manner with ease and accuracy by using the roadside guide marker and the entry angle guide marker.

Figure 15:
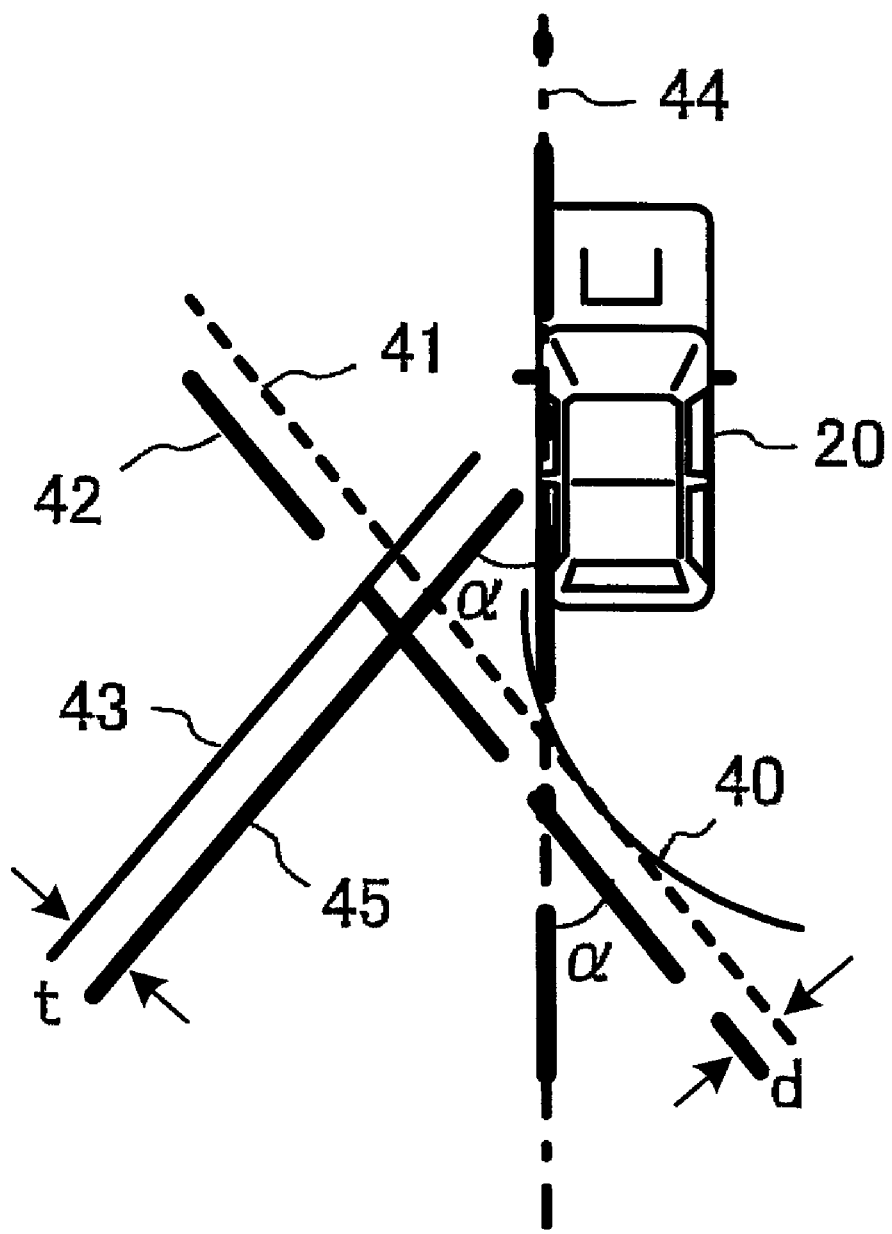
FIG. 15 is a view for explaining an angle of an automotive vehicle to a guide marker produced by the conventional driving assistance device.

While there has been described in the foregoing description about the fact that the entry angle guide marker is imaginarily in superimposed relationship with the roadside when the automotive vehicle moved in reverse gear at the maximum steering angle is inclined at an angle "α" with respect to the roadside. This angle is not limited by the value "α" shown in FIG. 15. In FIG. 15, this angle is equal to an angle between a leftward lateral line 44 parallel to a center line defined in a longitudinal direction of the automotive vehicle 50 and a tangent line 41 of an estimated vehicular swept path 40 of the automotive vehicle 50 to be moved in reverse gear at the maximum steering angle at an intersection point of the vehicular swept path 40 and the leftward lateral line 44 of the automotive vehicle 50. However, a tangent line different in intersection point from the tangent line 41 of the estimated vehicular swept path 40 may be defined on the left side of the intersection. In this case, the angle of the tangent line to leftward lateral line 44 is smaller than the above-mentioned angle "α". The more the angle of the tangent line to leftward lateral line 44 is decreased, the more the distance between the starting point of the parallel parking operation and the designated position of the parallel parking space is increased. Therefore, it's preferred that the entry angle guide marker is defined on the basis of the above-mentioned angle and distance.

Further, the guide markers may be superimposed on the image with a guide marker, disclosed in the patent document 2, useful for allowing the automotive vehicle 50 shown in FIG. 13(a) to move without bumping against other automotive vehicle parked in the vicinity of the automotive vehicle 50.

Figure 7:
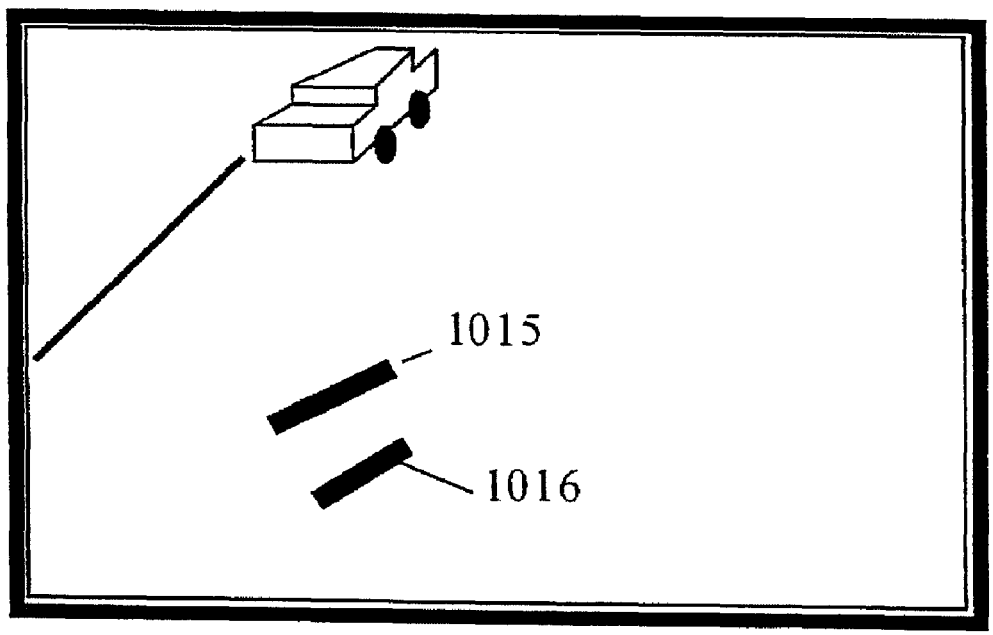
FIG. 7 is a view showing modified guide markers in the first embodiment of the driving assistance device according to the present invention.

In this embodiment, the roadside guide marker 1014 useful for confirming whether or not the roadside is correctly detected by the roadside detecting means 12 is superimposed on the image. However, it's not necessary to superimpose the roadside guide marker 1014 in the image as shown in FIG. 7.

Figure 8:
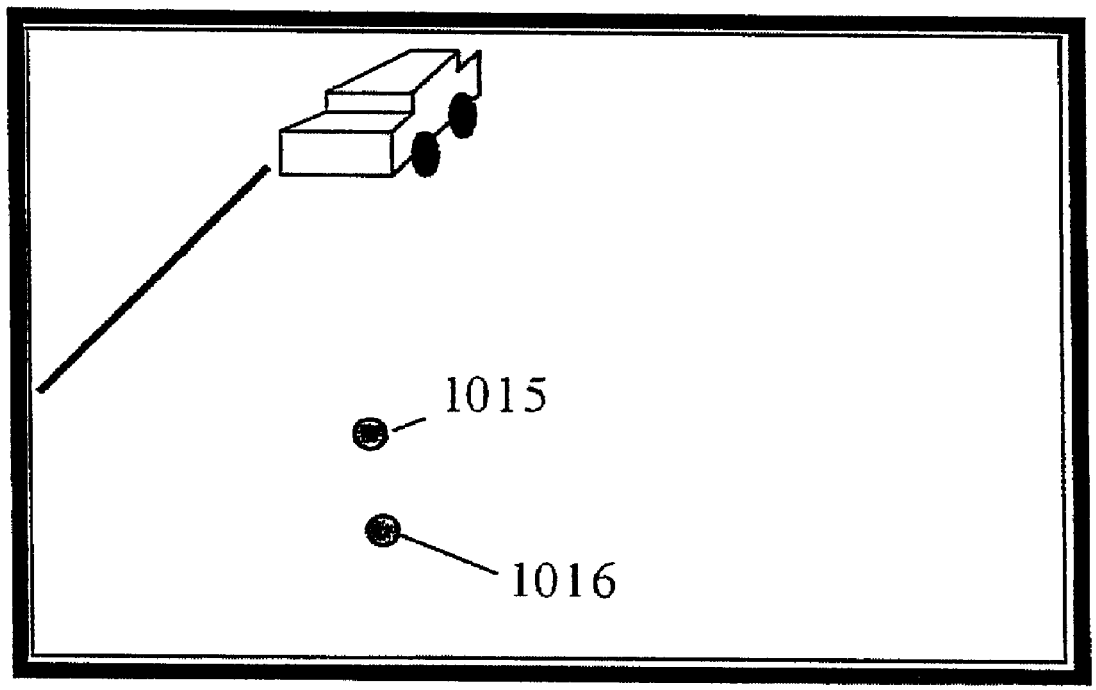
FIG. 8 is a view showing modified guide markers in the first embodiment of the driving assistance device according to the present invention.

In this embodiment, the entry angle guide marker 1015 and the switchback position guide marker 1016 are respectively constituted by straight lines. However, those guide markers may be respectively constituted by, for example, points as shown in FIG. 8 by reason that it is only necessary for the driver to confirm whether or not each guide marker is superimposed on the roadside on the screen.

While there has been described in the foregoing description about the operation of the driving assistance device according to the first embodiment on the assumption that the roadside detecting means 12 detects the roadside at a starting position (a position at which the automotive vehicle is firstly stopped). However, the roadside detecting means 12 may keep detecting the roadside until the automotive vehicle is parked in a parallel parking manner. When the angle of the automotive vehicle to the roadside is equal to a specific value, the guide markers may be superimposed on the image to be displayed on the screen. Sounds useful for informing that the automotive vehicle is inclined at the specific value with respect to the roadside may be outputted.

In this embodiment, the operation of the driving assistance device has been described on the assumption that the driver is about to park the automotive vehicle in a left rear parallel parking space. However the driving assistance device can assist the driver in parking the automotive vehicle in a right rear parallel parking space on the basis of the similar procedure. Therefore, the driving assistance device may selectively display the guide markers of the right rear parallel parking space and the guide markers of the left rear parallel parking space, or may display both the guide markers of the right rear parallel parking space and the guide markers of the left rear parallel parking space.

Second Embodiment

The driving assistance device according to the second embodiment of the present invention is adapted to assist a driver in parking an automotive vehicle in a parallel parking space by using two or more roadside guide markers and two or more entry angle guide markers.

Figure 9:
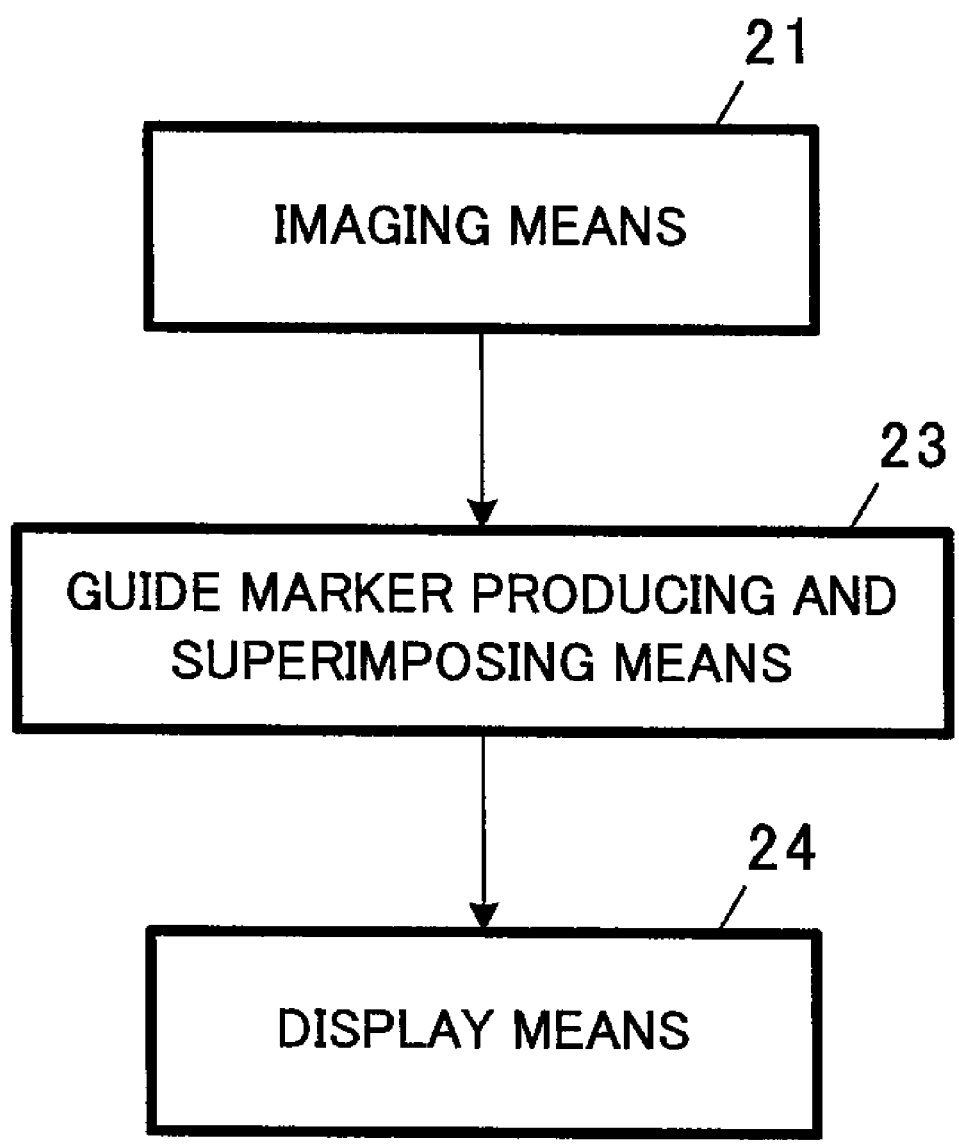
FIG. 9 is a block diagram showing the second embodiment of the driving assistance device according to the present invention.

As shown in FIG. 9, the driving assistance device comprises imaging means 21 for taking an image of an object behind an automotive vehicle 50, guide marker producing and superimposing means 23 for producing roadside guide markers, entry angle guide markers, and a switchback position guide marker, and superimposing those markers on the image, and displaying means 24 for displaying the image with those markers.

The imaging means 21 mounted on the automotive vehicle, and pointed at one or more objects behind the automotive vehicle is adapted to take an image indicative of the objects, and to output the image to the guide marker producing and superimposing means 23.

Figure 10:
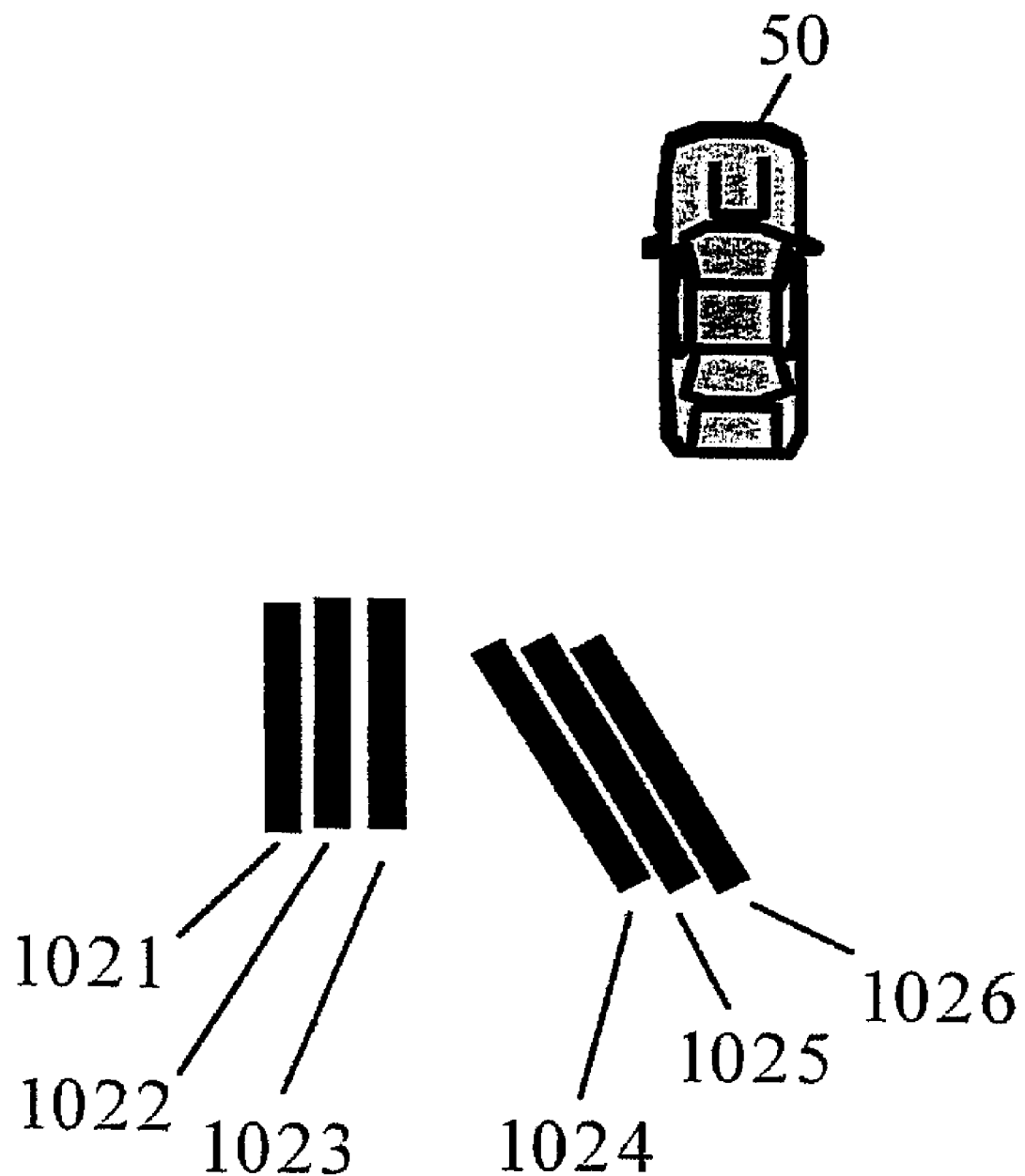
FIG. 10 is a view for explaining a roadside guide marker and an entry angle guide marker in the second embodiment of the driving assistance device according to the present invention.

As shown in FIG. 10, the guide marker producing and superimposing means 23 is adapted to produce, as the roadside guide marker, a guide marker 1021 parallel to and located at a specific distance from the automotive vehicle 50, a guide marker 1022 parallel to and located at the specific distance from the guide marker 1021, and a guide marker 1023 parallel to and located at the specific distance from the guide marker 1022.

The guide marker producing and superimposing means 23 is adapted to produce, on the basis of the procedure described in the first embodiment, an entry angle guide marker 1024 corresponding to the roadside guide marker 1021 superimposed on a roadside, an entry angle guide marker 1025 corresponding to the roadside guide marker 1022 superimposed on a roadside, and an entry angle guide marker 1023 corresponding to the roadside guide marker 1026 superimposed on a roadside.

The guide marker producing and superimposing means 23 is adapted to produce, on the basis of the procedure described in the first embodiment, a switchback position guide marker (not shown in FIG. 10).

The guide marker producing and superimposing means 23 is adapted to superimpose the produced guide markers on the image received from the imaging means 21, while the displaying means 24 is adapted to display the image with the guide markers.

As just described, each of the relationships between the roadside guide marker 1021 and the entry angle guide marker 1024, between the roadside guide marker 1022 and the entry angle guide marker 1025, and between the roadside guide marker 1023 and the entry angle guide marker 1026 is the same as the relationship between the roadside guide marker 1011 and the entry angle guide marker 1012 described in the first embodiment with reference to FIG. 2.

When, for example, the automotive vehicle 50 is stopped in parallel relationship with the roadside 57, the roadside guide marker 1021 is in superimposed relationship with the roadside 57 on the screen. The automotive vehicle 50 is then moved in reverse gear at the maximum steering angle. When the automotive vehicle 50 is inclined at a specific angle (for example, at an angle "α") with respect to the roadside 57, the entry angle guide marker 1024 is in superimposed relationship with the roadside 57 on the screen.

Even if the roadside 57 is located between the roadside guide markers 1021 and 1022 on the screen under the condition that the automotive vehicle 50 is stopped in parallel relationship with the roadside 57, the automotive vehicle 50 is moved in reverse gear at the maximum steering angle until the automotive vehicle 50 is inclined at an angle "α" with respect to the roadside 57. The roadside 57 is located between the entry angle guide markers 1024 and 1025 on the screen when the automotive vehicle 50 is inclined at an angle "α" with respect to the roadside 57.

From the foregoing description, it will be understood that the driving assistance device according to the second embodiment can allow the driver to judge, on the basis of the relative position of the roadside to the entry angle guide markers, whether or not the automotive vehicle 50 is inclined at a specific angle with respect to the roadside by allowing the driver to confirm the relative position of the roadside to the roadside guide markers at the time of firstly stopping the automotive vehicle 50 in parallel relationship with the roadside 57.

Figure 11:
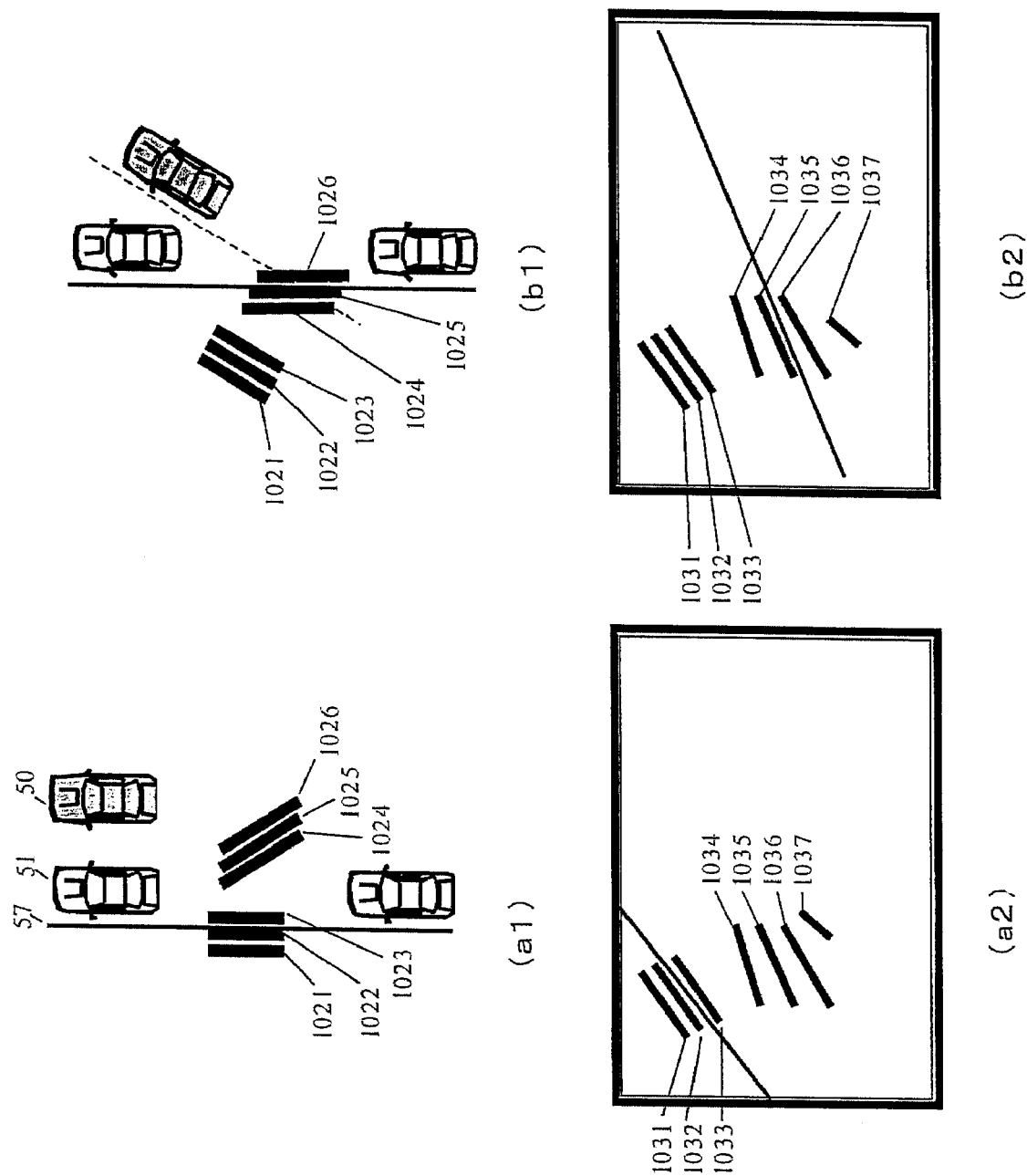
FIG. 11 is a view showing guide markers on the road and guide markers on the screen in the second embodiment of the driving assistance device according to the present invention.

The following description will be then directed to a procedure for assisting a driver in parking an automotive vehicle in a parallel parking manner on the basis of the guide markers superimposed on the image. FIGS. 11(a1) and 11(b1) are views showing the automotive vehicle on the road, the roadside guide markers 1021 to 1023, and the entry angle guide markers 1024 to 1026. FIGS. 11(a2) and 11(b2) are views corresponding to FIGS. 11(a1) and 11(b1), and showing images displayed with the roadside guide markers 1031 to 1033, the entry angle guide markers 1034 to 1037, and the switchback position guide marker 1037.

Firstly, the driver stops the automotive vehicle 50 next to an automotive vehicle 51 parked in a parking space adjacent to an empty parking space (see FIG. 11(a1)). Then, the driving assistance device superimposes the roadside guide markers 1021 to 1023, the entry angle guide markers 1024 to 1026, and the switchback position guide marker 1037 on the image (see FIG. 11(a2)). The roadside 57 lies between the roadside guide markers 1022 and 1023 on the road (see FIG. 11(a1)), while the roadside lies between the roadside guide markers 1032 and 1033 on the image displayed on the screen.

Then, the driver turns the steering wheel all the way to the left, and drives the automotive vehicle in reverse gear while focusing on the entry angle guide marker 1034 to 1036.

The intervals of the roadside guide markers 1031 to 1033 can be equated with the intervals of the entry angle guide markers 1034 to 1036 under the condition that the intervals of the roadside guide markers 1021 to 1023, or the intervals of the entry angle guide markers 1024 to 1026 are relatively narrow.

When the ratio of the interval of the roadside and the roadside guide marker 1032 and the interval of the roadside and the roadside guide marker 1033 is equal to, for example, 3:1 under the condition that the automotive vehicle is in parallel relationship with the roadside as shown in FIG. 11(a2), the drive assistance device according to the second embodiment can allow the driver to confirm whether or not the automotive vehicle is inclined at a predetermined angle with respect to the roadside by confirming that the ratio of the interval of the roadside and the entry angle guide marker 1035 and the interval of the roadside and the entry angle guide marker 1036 is equal to 3:1 when the automotive vehicle is moved in reverse gear at the maximum steering angle (see FIG. 11(b2)).

From the foregoing description, it will be understood that the driving assistance device can allow the driver to confirm the current position and direction of the automotive vehicle with accuracy, and to park the automotive vehicle in the parallel parking space with ease and accuracy on the basis of the relative position of the roadside to the roadside guide markers and the relative position of the roadside to the entry angle guide markers.

Figure 12:
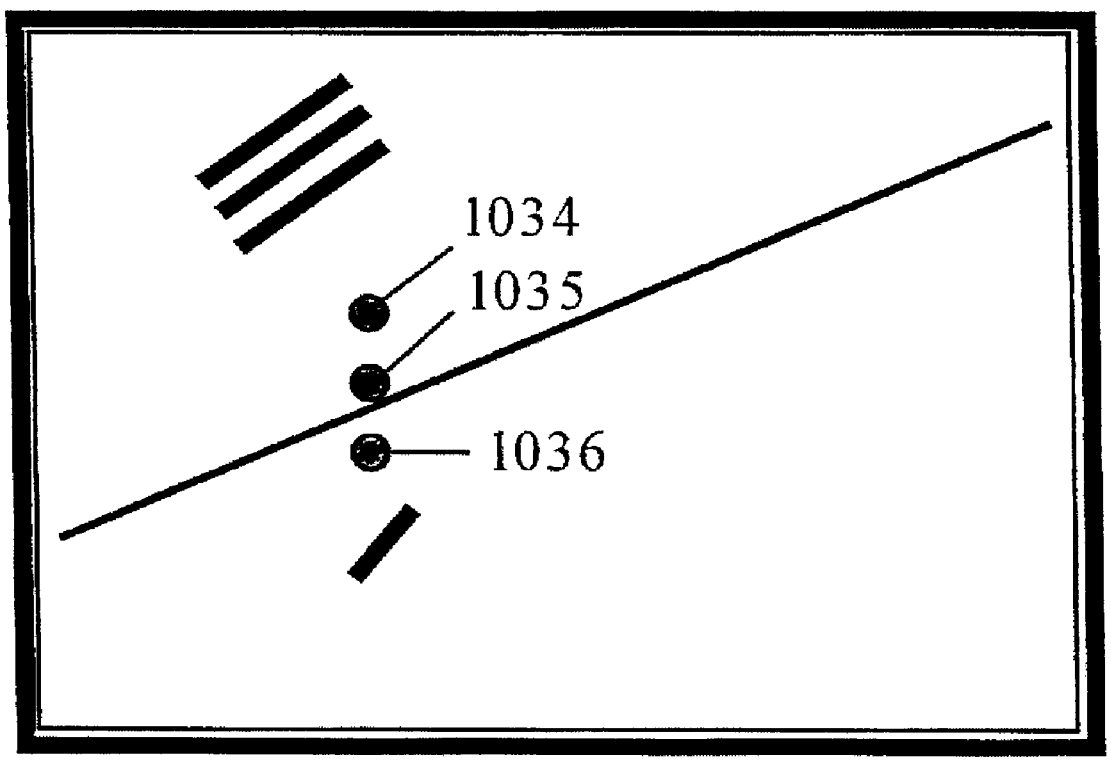
FIG. 12 is a view showing modified guide markers in the second embodiment of the driving assistance device according to the present invention.

In this embodiment, the entry angle guide markers are constituted by respective straight lines. However, the entry angle guide markers may be constituted by respective points as shown in FIG. 12 by reason that the driver can confirm the ratio of the interval of the roadside and one of the entry angle guide markers and the interval of the roadside and the other of the entry angle guide markers corresponding to the ratio of the interval of the roadside and one of the roadside guide markers and the interval of the roadside and the other of the roadside guide markers.

In this embodiment, the operation of the driving assistance device has been described on the assumption that the driver is about to park the automotive vehicle in a left rear parallel parking space. However the driving assistance device can assist the driver in parking the automotive vehicle in a right rear parallel parking space on the basis of the similar procedure. Therefore, the driving assistance device may selectively display the guide markers of the right rear parallel parking space and the guide markers of the left rear parallel parking space, or may display both the guide markers of the right rear parallel parking space and the guide markers of the left rear parallel parking space.

In each embodiment, a straight line tangent to an estimated vehicular swept path of the automotive vehicle to be moved in reverse gear at the maximum steering angle are used as a switchback position guide marker. However, an estimated vehicular swept path of the automotive vehicle to be moved in reverse gear with the other maximum steering angle may be used as the switchback position guide marker.

While the subject invention has been described with relation to the preferred embodiments, various modifications and adaptations thereof will now be apparent to those skilled in the art as far as such modifications and adaptations fall within the scope of the appended claims intended to be covered thereby.

INDUSTRIAL APPLICABILITY OF THE PRESENT INVENTION

As will be seen from the foregoing description, the driving assistance device according to the present invention has an advantageous effect of allowing a driver to confirm whether or not the guide marker is in parallel relationship with the roadside. The driving assistance device according to the present invention is useful as an apparatus for assisting a driver to ensure that the driver parks the automotive vehicle in a parallel parking space with accuracy.

What is claimed is:

1. A driving assistance device, comprising: imaging means for taking an image of an object behind an automotive vehicle; and displaying means for displaying, on a screen, said image with support information useful in assisting a driver in parking said automotive vehicle in a parallel parking space, characterized in that said driving assistance device further comprises:

roadside detecting means for detecting a roadside from said image taken by said imaging means in the vicinity of said parallel parking space; and guide marker producing and superimposing means for producing, at least, first and second guide markers as said support information, and superimposing said first and second guide markers on said image to be displayed by said displaying means, wherein said guide marker producing and superimposing means is adapted to estimate an on-screen position of said first guide marker to said automotive vehicle, said automotive vehicle being moved toward said parallel parking space in reverse gear at one of maximum steering angles opposite to each other until an angle of said automotive vehicle to said roadside is equal to a predetermined value, said first guide marker being in superimposed relationship with said roadside detected by said roadside detecting means at the time of allowing said angle of said automotive vehicle to said roadside to be equal to said predetermined value, to estimate an on-screen position of said second guide marker to said automotive vehicle, said automotive vehicle being moved toward said parallel parking space straight in reverse gear after said first guide marker is superimposed on said roadside until said second guide marker is superimposed on said roadside detected by said roadside detecting means, and to ensure that said automotive vehicle is parked in said parallel parking space upon moving in reverse gear at the other of said maximum steering angle at the time of allowing said second guide marker to be superimposed to said roadside detected by said roadside detecting means.

2. A driving assistance device as set forth in claim 1, in which said guide marker producing and superimposing means is adapted to define, as said first guide marker, a first straight line inclined at a predetermined angle with respect to said automotive vehicle, and to define, as said second guide marker, a second straight line parallel to said first straight line, and tangent to an estimated vehicular swept path of said automotive vehicle to be moved in reverse gear at the other of said maximum steering angles.

3. A driving assistance device as set forth in claim 1, in which at least one of said first and second guide markers is represented by a point.

4. A driving assistance device as set forth in claim 1, in which said guide marker producing and superimposing means is adapted to define, as said first guide marker, a straight line inclined at a predetermined angle with respect to said automotive vehicle, and to define, as said second guide marker, an estimated vehicular swept path of said automotive vehicle to be moved in reverse gear at the other of said maximum steering angles.

5. A driving assistance device as set forth in any one of claims 1 to 4, in which said guide marker producing and superimposing means is adapted to produce a third guide marker for indicating a position of said roadside detected by said roadside detecting means, and to superimpose, on said image to be displayed by said displaying means, said third guide marker with said first and second guide markers.

6. A driving assistance device as set forth in any one of claims 1 to 4, in which said roadside detecting means is adapted to detect two or more candidate roadsides from said image taken by said imaging means in the vicinity of said parallel parking space, and in which said guide marker producing and superimposing means is adapted to have two or more third guide markers indicate respective on-screen positions of said candidate roadsides, to produce, as said first guide marker, two or more first guide markers corresponding to said respective candidate roadsides, and to superimpose, on said image to be displayed by said displaying means, said first to third guide markers, said automotive vehicle being moved toward said parallel parking space in reverse gear at one of said maximum steering angles until said angle of said automotive vehicle to said roadside is equal to said predetermined value, said first guide marker corresponding to said candidate roadside selected as said roadside being superimposed on said selected candidate roadside when said angle of said automotive vehicle to said roadside is equal to said predetermined value.

7. A driving assistance device, comprising: imaging means for taking an image of an object behind an automotive vehicle; and displaying means for displaying, on a screen, said image with support information useful in assisting a driver in parking said automotive vehicle in a parallel parking space, characterized in that said driving assistance device further comprises guide marker producing and superimposing means for producing first to third guide markers as said support information, and superimposing said first to third guide markers on said image to be displayed by said displaying means, wherein said guide marker producing and superimposing means is adapted to have said third guide markers indicate respective on-screen positions of said candidate roadsides, to estimate on-screen positions of said first guide markers to said automotive vehicle, said automotive vehicle being moved toward said parallel parking space in reverse gear at one of said maximum steering angles opposite to each other until an angle of said automotive vehicle to said roadside is equal to a predetermined value, said first guide marker corresponding to said candidate roadside selected as a roadside being superimposed on said selected candidate roadside when said angle of said automotive vehicle to said roadside is equal to said predetermined value, and to estimate on-screen positions of said second guide markers of said automotive vehicle, said automotive vehicle being moved toward said parallel parking space straight in reverse gear after said first guide marker is superimposed on said roadside until said second guide marker corresponding to said candidate roadside selected as said roadside is superimposed on said selected candidate roadside, and to ensure that said automotive vehicle is parked in said parallel parking space upon moving in reverse gear at the other of said maximum steering angle at the time of allowing said second guide marker corresponding to said candidate roadside selected as said roadside is superimposed on said selected candidate roadside.

8. A driving assistance device as set forth in claim 7, in which said guide marker producing and superimposing means is adapted to define, as said first guide markers related to said respective candidate roadsides, first straight lines inclined at respective angles with respect to said automotive vehicle, and to define, as said second guide markers related to said respective candidate roadsides, second straight lines parallel to said first straight line, and tangent to an estimated vehicular swept path of said automotive vehicle to be moved in reverse gear at the other of said maximum steering angles.

9. A driving assistance device as set forth in claim 7 or claim 8, in which at least one of said first to third guide markers is represented by a point.

10. A driving assistance device as set forth in claim 7, in which said guide marker producing and superimposing means is adapted to define, as said first guide markers, a line inclined at a predetermined angle with respect to said automotive vehicle to have said line occupy said first position, and to define, as said second guide marker, an estimated vehicular swept path of said automotive vehicle to be moved in reverse gear at the other of said maximum steering angles.

11. A driving assistance device as set forth in claim 6, in which said guide marker producing and superimposing means is adapted to have said first guide markers belong to respective groups, to have said third guide markers belong to said respective groups, and to characterize said first and third guide markers of each group by color or by shape.

12. A driving assistance device as set forth in claim 7, in which said guide marker producing and superimposing means is adapted to have said first guide markers belong to respective groups, to have said third guide markers belong to said respective groups, and to characterize said first and third guide markers of each group by color or by shape.

* * * * *